United States Patent Office 2,729,659
Patented Jan. 3, 1956

2,729,659

LARD OIL AND OLEO OIL

Waldo C. Ault and Steward G. Morris, Philadelphia, Pa., assignors to the United States of America as represented by the Secretary of Agriculture No Drawing. Application June 17, 1952,
Serial No. 294,111

2 Claims. (Cl. 260—409)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to novel oil fractions of the type of lard oil, oleo oil or grease oil derived from animal fats or oils and to methods for providing them. It relates particularly to methods for preparing from animal fats or oils, novel fractions having comparatively low titer which at the same time contain not more than 5 per cent polyunsaturated components.

Lard oil is prepared commercially at the present time by expression of the liquid portion of the lard or grease after the starting material has been tempered or grained by storage at a constant temperature, usually about 45° F. Oleo oil and oleostearin are prepared from tallow by a similar process, but a higher temperature may be used. If the starting material is lard of an edible grade, the operation may be conducted with a view to preparing the edible products, lard oil and the solid residue, lard stearin. Edible lard oil may be used in a variety of ways, such as for example in greasing bakery pans or tins or as a component of blended shortenings; lard stearin is used for stiffening or hardening soft lards and may also be used to harden lards being shipped to warmer climates.

Lard oil obtained from both edible and inedible fats may also be employed for burning, as a lubricant, for use in machining of metals and in textile spinning. It may also be used in the preparation of soaps, sulfonated products and similar surface active agents. Inedible stearins may advantageously be used with softer oils in soap manufacture.

Depending upon the composition of the starting material and upon the characteristics desired in the finished product, lard oil may be obtained from lard or grease in yields varying from about 40% to 60% of the starting material, but the usual yield is about 45% to 55%. The process of graining is time-consuming and the pressing operation requires considerable hand labor and is difficult to control. Moreover, lard oil, as it is presently produced is prone to rancidity and has an undesirable tendency to oxidize and polymerize with resulting formation of undesirable offensive odors and even gumminess and stickiness may result. Antioxidant addition has not served to control these undesirable reactions to the desired degree.

We have found that our process can be used to produce improved grades of lard oil, grease oil and oleo oils having increased resistance to rancidity with resulting improved resistance to the development of undesirable odors and gummy, sticky polymerization products. Our process may also be used to produce oleo oils having improved resistance to odor and flavor deterioration.

In general, our process comprises the selective hydrogenation of the polyunsaturated component fatty acids, particularly linoleic, linolenic and arachidonic acids, which are in combination as glycerides in the fat, at a temperature of about from 300° to 350° F. to reduce substantially all of the said polyunsaturated component fatty acids to either saturated or monoethenoic components while the monounsaturated acids, particularly oleic acid, also in combination, remains substantially unaffected. In our preferred embodiment this selective hydrogenation is then followed by fractional crystallization of the glycerides from a suitable solvent at or above about 15° F. to precipitate solid glycerides which are then separated by filtration or other convenient means. After separation of the solid glycerides, the liquid glycerides are recovered from the solvent by evaporation of the latter in a stripping still or by other known methods. The solvent is also recovered from the solid glycerides in a similar manner.

In the following Table I there is set forth the approximate average composition of the fatty acids of certain important animal fats which are well adapted as starting materials in the application of our invention.

TABLE I

Approximate average composition of fatty acids of industrially important animal fats.

| | Percent Saturated Acids | Percent Monoethenoic Acids | Percent Polyunsaturated Acids |
|---|---|---|---|
| Lard | 38.0 | 55.0 | 7.0 |
| Tallow | 52.0 | 45.0 | 3.0 |
| Grease (Inedible) | 37.0 | 52.0 | 11.0 |
| Tallow (Inedible) | 48.0 | 46.0 | 6.0 |

In the application of our invention, the fats are hydrogenated preferably under selective conditions, until the component polyunsaturated acids have been reduced to a low level or substantially eliminated but the hydrogenation process is stopped before significantly affecting the component monoethenoic constituents, such as oleic acid, and our preferred procedure reduces substantially all of the polyunsaturated components to either monoethenoic or saturated substances without significantly affecting the monoethenoic constituents such as oleic acid. The degree of hydrogenation required is approximately proportional to the percentage of polyunsaturated component acids in the fat or oil. We have found that with most tallows, lards, and greases a satisfactory degree of hydrogenation can be obtained by hydrogenating the fat to the point where the iodine number has been reduced numerically about equivalent to the numerical percentage of polyunsaturated components present. For example, satisfactory results were obtained with a lard having an iodine number of 63.2 and a total polyunsaturated acid component content of 7.1% when the iodine number was reduced by hydrogenation to 55.9, a reduction of 7.3 units.

Any method may be used for the hydrogenation which will give the desired selectivity although it is preferred to operate at a temperature of about from 300° F. to 350° F. and using hydrogen at a pressure about from atmospheric pressure to 50 pounds per square inch in the presence of nickel catalysts. We also prefer to avoid prolonged holding of the fat at the elevated temperature in the presence of the catalyst or other steps which may produce avoidable isomerization and elaidinization. We have found it desirable in some cases to refine the fat by treatment with carbon, clays or caustic prior to hydrogenation but this is not always necessary. The presence of free fatty acids does not interfere with the operation of our process; but, of course, the fatty acids present in the starting material will be found distributed in the products.

After selective hydrogenation the more saturated, higher melting glycerides may be separated from the more unsaturated, lower melting glycerides in a variety of ways, for example, by graining and pressing or preferably by fractional crystallization from a suitable solvent. The latter will be considered first.

The fractional crystallization method comprises dissolving the selectively hydrogenated fat in a suitable solvent from which its component glycerides are fractionally crystallized. The catalyst used in hydrogenation may be removed by filtration or other suitable means prior to dissolving in the solvent or it may be removed from the resulting solution. The conditions for conducting the crystallization step may be varied widely to obtain different desired properties in the product. For example, the crystallization may be conducted at temperatures ranging about from −25° F. up to about +70° F. As solvents, petroleum fractions such as commercial hexane or heptane, ketones such as acetone, or dimethyl ketone, chlorinated solvents such as chloroform or ethylene dichloride, aromatic hydrocarbons such as toluene or xylene or alcohols such as methyl, ethyl or isopropyl are suitable. Very frequently it is advantageous to use mixtures of two or more of the above solvents. The solvent should not solidify or develop undesirable viscosity at the temperatures used and it should be readily recoverable. It should be a good solvent for the fats, but not so powerful as to prevent the crystallization of the more saturated components at the temperatures used. We have found acetone to be a very suitable solvent. We have found that the amount of solvent can be varied over quite wide ranges; we have used amounts varying from 4 times the volume of the fat to 20 times the volume of the fat.

The fractional crystallization of the glycerides may be conducted stepwise, that is, the most insoluble glycerides may be crystallized at a relatively high temperature, for example, in the range of about from 50–60° F. and then removed by filtration. The filtrate may then be cooled further, for example, to some temperature in the range of about from 15° F. to 30° F. and the material which crystallizes, obtained as a separate fraction. This furnishes a means of obtaining not only the desired lard oil or oleo oil fractions, but also for obtaining special stearin fractions having improved properties for incorporation in foodstuffs such as special bakery products.

The graining out and pressing or filtering procedure will now be described. This treatment of the selectively hydrogenated fats comprises graining out or crystallizing the more saturated higher melting glyceride components from the fat and separating the liquid portion from the solidified portion by pressing or filtration. The procedure will vary somewhat with the nature of the raw material being used on the one hand and with the qualities desired in the finished product on the other hand. In general, the graining operation will be conducted at temperatures in the range of from about 50° F. to 100° F. The graining operation may be conducted in vats, pans or other suitable containers and the separation may be performed by placing the cake in bags and pressing. Alternatively the grained material may be filtered in a filter press suitably equipped to permit separation of the solid glyceride components.

After the more saturated glyceride components have been recovered and the solvent evaporated or after the graining and pressing or filtering operation, the remaining product will constitute principally the lower melting glyceride components of the selectively hydrogenated fat. It may be used as such for various purposes such as textile lubrication or a machine shop lubricant and the like.

In general, therefore, our invention includes any operation involving the selective hydrogenation of a glyceride fat or oil, followed by a separation which involves a graining out and pressing or filtering separation of the more saturated glycerides from the less saturated glycerides, or followed by a purification which involves a fractional crystallization of the selectively hydrogenated material, to yield the more saturated glycerides as a precipitate which may be separated from the less saturated glycerides which remain dissolved in the solvent and are recovered by suitable means for solvent removal and recovery.

The following examples are illustrative of the invention:

*Example 1*

1000 grams of lard having an iodine number of 63.1 was selectively hydrogenated at atmospheric pressure by vigorously stirring it in the presence of .1% nickel catalyst using a temperature of 330° F. until the iodine number was reduced to 54.3. Examination of the lard before and after hydrogenation showed it to contain a total of 8.1% polyunsaturated acid components before hydrogenation and only 1.4% such components after hydrogenation.

After removal of the nickel catalyst by filtration, the hydrogenated lard (980 grams) was dissolved in 7 volumes of acetone. The solution was cooled to 30° F. and allowed to stand overnight at that temperature. It was then filtered and the solvent was removed from both the precipitate or lard stearin portion and also from the liquid or lard oil portion by distillation, followed by vacuum, steam distillation at the end to remove all traces of acetone. 572 grams of edible lard oil was obtained, a yield of 58.4%, and 402 grams of lard stearin was also recovered. These materials had the following properties, shown in Table II.

TABLE II

*Properties of lard oil and lard stearin from Example 1*

| | Lard Oil | Lard Stearin |
|---|---|---|
| Sap. No | 196.1 | 193.4 |
| Iodine Value | 72.6 | 27.4 |
| Titer (Melting Point of Fatty Acids) °C | 31 | |
| Pour Point °F | 40 | |
| Flash Point °F | 460 | |
| Polyunsaturated Acid Content percent | 3.8 | 0.9 |

The lard oil obtained by this procedure had excellent color, odor and stability. Moreover, it was very susceptible to stability improvement by addition of antioxidants.

*Example 2*

717 grams of lard having an iodine number of 66.5 was selectively hydrogenated at atmospheric pressure by vigorously stirring it in the presence of .1% nickel catalyst using a temperature of 312° F. Portions of 200 grams each were removed at intervals as shown below in Table III for examination and for preparation of a lard oil fraction by fractional crystallization from 7 volumes of acetone at 32° F. Results are shown in Table III.

TABLE III

*Yield and properties of lard oil related to hydrogenation*

| Time of Hydrogenation, Hours | Iodine Number (Material before Crystallization) | Yield of Lard Oil | Titer of Lard Oil | Iodine Number Lard Oil | Total Polyunsaturated Content Lard Oil |
|---|---|---|---|---|---|
| | | | °C. | | |
| Original | 66.5 | 65.5 | 31.5 | | 12.4 |
| 1 Hour | 60.1 | 66.0 | 31.3 | 72.7 | 5.2 |
| 1¼ Hours | 57.3 | 63.0 | 31.5 | 69.9 | 4.8 |
| 1½ Hours | 53.5 | 56.0 | 31.0 | 67.9 | 3.1 |

The following facts are demonstrated by this experiment.

(1) Our invention in its preferred embodiments gives yields of lard oil as large or larger than those obtained today.

(2) The increased yield and improved stability are effected without undesirable increase in the titer which is a measure of the melting point of the mixed fatty acids.

In fact, despite the lower iodine number and greater stability titers of lard oils made by our preferred procedures are frequently below those made by present conventional methods.

Example 3

1268 grams of inedible grease having an iodine value of 63.6 was treated with 0.5% carbon and filtered while warm. 5.2 grams of a commercial flake catalyst containing 24.4% finely divided nickel was then added to it and it was hydrogenated at a temperature of 305°–320° F. until the iodine value was 49.3. 1200 grams of this hydrogenated grease was then dissolved in 12 liters of acetone by warming. After solution was complete it was allowed to stand overnight at room temperature (68°–75° F.). The precipitate which formed was removed by filtration. After the solvent was removed from the filtrate, 929 grams (77.4% yield) was obtained. This material had a lowered titer and softening point making it very desirable for use in hot dip tinning of steel sheets after addition of 7% fatty acids from a hydrogenated grease.

Example 4

1000 grams of tallow having an iodine number of 49.4 and a titer of 43.5° C. was selectively hydrogenated at atmospheric pressure by vigorously stirring it in the presence of .1% nickel catalyst using a temperature of 305–320° F. until the iodine number was reduced to 46.6. Forty-five minutes were required. Examination of the tallow before and after hydrogenation by the spectrophotometric method for determination of polyunsaturated fatty acid components showed it to contain a total of 3.6% polyunsaturated acid components before hydrogenation and 1.1% after hydrogenation.

After removal of the nickel catalyst by filtration, the hydrogenated tallow was dissolved in 8 volumes of acetone by warming. The solution was cooled to 60° F. and allowed to stand 2 hours at that temperature. It was then filtered and the solvent was removed from both the precipitate or oleostearin portion and the filtrate or oleo oil portion. 564 grams of oleo oil having a soft pasty consistency at room temperature was recovered.

Example 5

400 grams of lard was hydrogenated using the process described in Example 1. After removal of the nickel catalyst by filtration of the melted lard it was poured into a shallow dish in a layer 1 inch thick and stored for 24 hours at 45° F. The cake was then removed from the dish, wrapped in a filter cloth and quickly pressed to yield 128 grams of lard oil. Because of the large amount absorbed by the filter cloth this yield is hardly representative of results to be expected on a larger scale, but the resulting lard oil had a polyunsaturate content below 5% and a pour point below 45° F. Moreover, it had improved color, odor and stability when compared with lard oil made in the conventional manner.

Having thus described our invention what we claim is:

1. A process for the preparation of relatively low titer glyceride fractions from a material selected from the class consisting of animal fats and oils, comprising selectively hydrogenating said material at a temperature of about from 300° to 350° F. to reduce substantially all of the polyunsaturated component fatty acids contained therein to either saturated or monoethenoic components without significantly affecting the monoethenoic component fatty acids originally present therein and then separating the low titer glyceride fractions from the less soluble, higher titer glyceride fractions of the glyceride mixture so obtained by causing the crystallization of the latter fractions as a solid phase and recovering the low titer components as a liquid, said low titer components having increased resistance to rancidity with resulting improved resistance to the development of undesirable odors and gummy, sticky polymerization products, and having also, improved resistance to oil and flavor deterioration.

2. A process for the preparation of a relatively low titer lard oil comprising selectively hydrogenating lard in the presence of nickel catalyst and at a temperature of about from 300° to 350° F. to reduce the polyunsaturated component fatty acids contained therein to about 1.4% without significantly effecting the monoethenoic fatty acid components originally present therein, separating the catalyst, dissolving the hydrogenated lard in acetone, cooling the resulting acetone solution to about 30° F. until crystallization of solid fat is substantially complete, separating the liquid portion from said solid fat, and recovering the resulting lard oil from said liquid portion by evaporation of the acetone solvent, said resulting lard oil having increased resistance to rancidity with resulting improved resistance to the development of undesirable odors and gummy, sticky polymerization products, and having, also, improved resistance to oil and flavor deterioration.

References Cited in the file of this patent

UNITED STATES PATENTS

| | | |
|---|---|---|
| 2,443,063 | Adelson | June 8, 1948 |
| 2,457,611 | Swern et al. | Dec. 28, 1948 |
| 2,627,467 | Gooding | Feb. 3, 1953 |
| 2,631,157 | Hixson et al. | Mar. 10, 1953 |
| 2,636,888 | Washburn | Apr. 28, 1953 |
| 2,645,652 | Pramuk | July 14, 1953 |